United States Patent [19]

Caldwell

[11] 4,005,547
[45] Feb. 1, 1977

[54] THERMALLY RESPONSIVE VENTILATED COLD FRAME

[76] Inventor: Edward N. Caldwell, Rte. 17 Coward Mill Road, Knoxville, Tenn. 37921

[22] Filed: Aug. 7, 1975

[21] Appl. No.: 602,551

[52] U.S. Cl. .................. 47/28 R; 47/19; 47/29; 49/31; 98/1; 160/6; 160/373; 236/49

[51] Int. Cl.² .................. A01G 13/04; A01G 9/24

[58] Field of Search ............ 47/29, 28, 26, 19, 17; 236/100, 99 I, 99 G, 95, 86, 49; 49/2, 31, 34; 52/200, 1; 98/1; 160/21, 373, 6

[56] References Cited

UNITED STATES PATENTS

| | | | |
|---|---|---|---|
| 585,009 | 6/1897 | Taylor et al. | 47/29 UX |
| 2,434,090 | 1/1948 | Alton | 236/49 |
| 2,592,976 | 4/1952 | Thomas | 47/19 X |
| 2,608,797 | 9/1952 | Rawson | 47/19 |
| 3,103,158 | 9/1963 | Noll | 236/49 UX |
| 3,129,530 | 4/1964 | Anderson | 47/19 |
| 3,131,563 | 5/1964 | Britton | 236/99 I |
| 3,325,951 | 6/1967 | Johnson | 49/34 X |
| 3,398,483 | 8/1968 | Ringel et al. | 49/34 |
| 3,698,131 | 10/1972 | Kesinger | 47/29 |

FOREIGN PATENTS OR APPLICATIONS

| | | | |
|---|---|---|---|
| 1,215,951 | 4/1960 | France | 47/29 |
| 1,270,399 | 7/1961 | France | 47/17 |
| 1,296,601 | 5/1962 | France | 47/19 |
| 415,159 | 12/1966 | Switzerland | 47/29 |
| 657,211 | 2/1949 | United Kingdom | 47/19 |

Primary Examiner—Edgar S. Burr
Assistant Examiner—Steven A. Bratlie
Attorney, Agent, or Firm—Douglas R. Scott

[57] ABSTRACT

A cold frame for providing an environment conducive to the growing of plants having walls and a flexible, light-transmitting cover member which is flexed to form a ventilation opening. The cover member is flexed manually or by means responsive to the temperature of the interior of the cold frame.

5 Claims, 11 Drawing Figures

THERMALLY RESPONSIVE VENTILATED COLD FRAME

Cold frames, which are also called hot beds in some areas, have long been used to protect young plants from the weather in the early part of a growing season. For many years they have taken the form of an open box covered with a glazed window sash. While these cold frames would protect plants from the cold, sunlight passing through the glazing could raise the temperature of the interior high enough to destroy the plants even on cold days. Consequently, they needed constant attention with a grower manually moving the sash to ventilate the interior when the sun was shining brightly and moving it back when cloudy.

Attempts have been made to automatically ventilate cold frames by hinging the sash on the box and raising it with an actuator responsive to the temperature of the interior of the frame. However, these approaches required relatively powerful actuators or careful counterbalancing of the sash and a well-balanced, hinged sash has the inherent disadvantage of being unstable in the slightest wind. Examples of this type of cold frame are disclosed in the following patents: Rawson U.S. Pat. No. 2,608,797, Anderson U.S. Pat. No. 3,129,530 and Thomas U.S. Pat. No. 2,592,976.

An object of this invention is to minimize the work required to ventilate a cold frame so that ventilation can be controlled by a small, inexpensive, thermal element.

Another object of this invention is to provide a flexible, light-transmitting, self-supporting cover member for a cold frame which may be flexed to provide ventilation openings in response to temperature changes within the frame.

Another object of this invention is to provide a cold frame with a configuration which will cause the flexing of a flexible cover member to produce high and low openings for optimum ventilation.

Another object of this invention is to ventilate a cold frame by flexing one of its structural members.

Referring to the drawings wherein.

Figure 1:
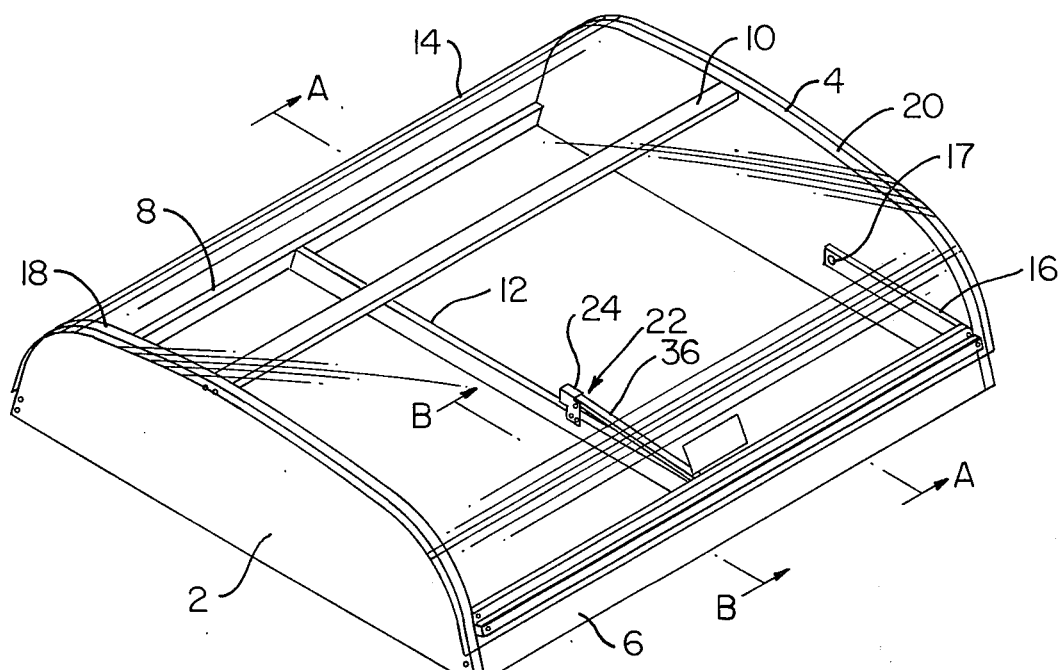
FIG. 1 is a perspective view of a cold frame embodying this invention.

The cold frame shown in FIGS 1 through 4 comprises wall members including end walls 2, 4 and side walls 6, 8. The wall members are braced with cross members 10, 12 which are respectively connected to the end walls 2, 4 and the side walls 6, 8 to provide a rigid structure. A flexible, light-transmitting, self-supporting cover member 14 is connected at one end to the side member 8 and at the other end to a cover mounting U-shaped frame 16 which is pivotally mounted on the end walls 2, 4 on suitable pivots 17. The cover member 14 is formed of a sheet material such as Acrylic and is of sufficient thickness to be self-supporting but is thin enough to permit substantial flexing of the sheet. It has been found that an Acrylic sheet 0.030 inches in thickness performs well in this application.

Figure 5:
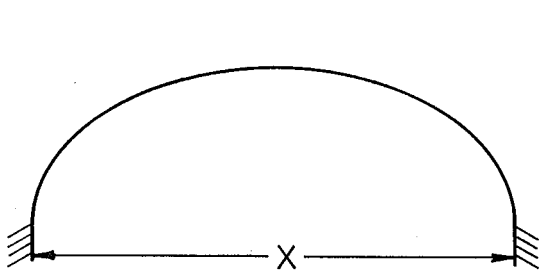
FIG. 5 is a diagram showing a shape assumed by a flexible, self-supporting structural member with its ends held by supports spaced at a first distance from each other.
Figure 6:
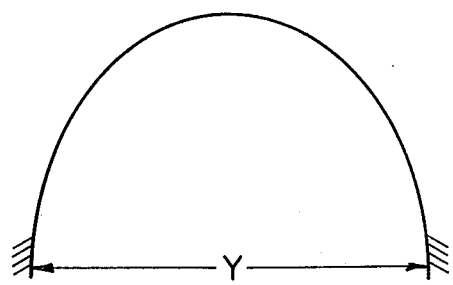
FIG. 6 is a diagram showing a shape assumed by a flexible, self-supporting structural member with its ends held by supports spaced at a second distance from each other.

Referring to FIGS. 5 and 6, it can be seen that a self-supporting, flexible structural member will assume one shape with its ends held by supports spaced from each other by a distance X and will assume a second shape when the supports are spaced at a distance Y. The upper edges 18, 20 of the end walls 2, 4 are shaped to be complementary with the natural form assumed by the cover member 14 with its ends fixed at a distance determined by the width of the end walls 2, 4. This assures sealing engagement between the cover member 14 and the end walls 2, 4 with the cover member in the closed position as shown in FIGS. 1 and 2.

Figure 3:
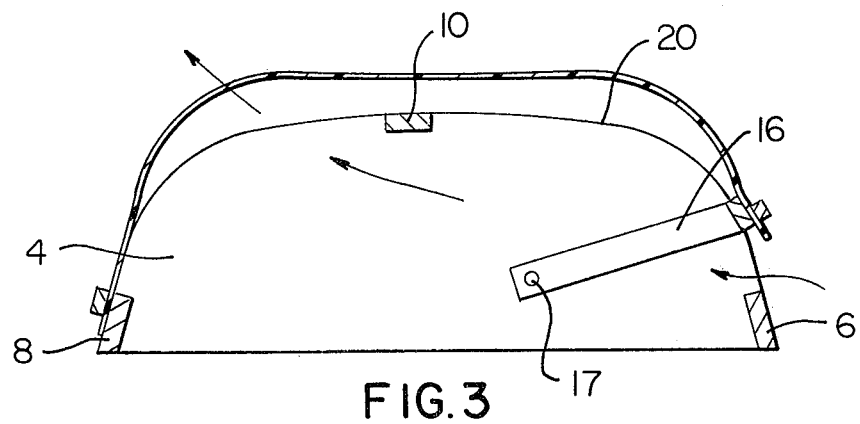
FIG. 3 is a view similar to FIG. 2 with the parts thereof in a second operating position.

An operator, indicated generally by reference numeral 22, is carried by the cross member 12 and engages the U-frame 16 to raise the end of the cover member 14 that is connected to the U-frame 16 and flex the cover member 14, causing it to move out of contact with the upper edges 18, 20 of the side walls 2, 4 thereby creating high and low ventilation openings as shown in FIG. 3.

Figure 8:
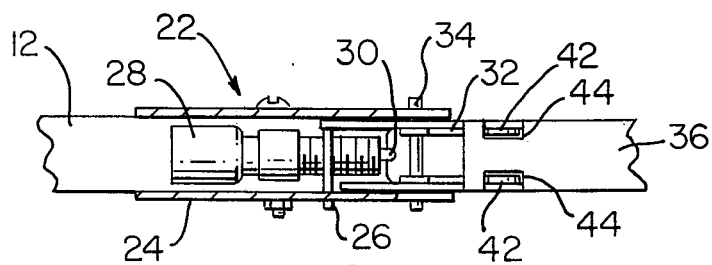
FIG. 8 is a sectional view taken on the line C—C of FIG. 7.
Figure 7:
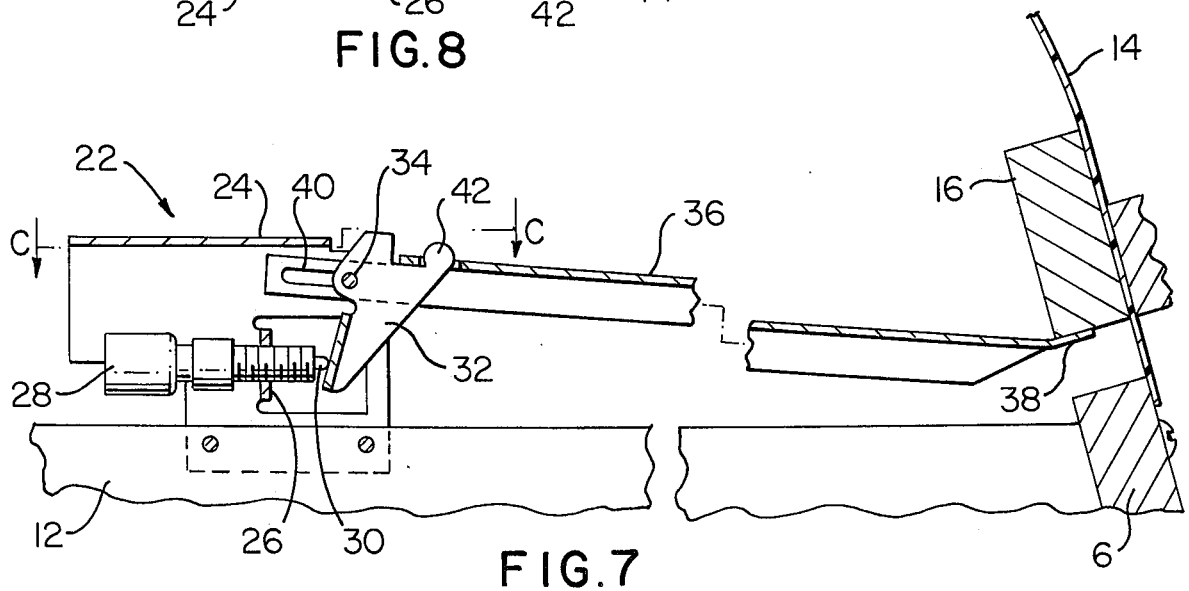
FIG. 7 is a sectional view taken on the line B—B of FIG. 1.

The operator 22, as shown in FIGS. 7 and 8, comprises a mounting bracket 24 bolted to the cross member 12 and including an inwardly turned tab 26 through which is threaded a thermally responsive power element 28. The power element 28 is of a type well known in the art containing a wax which is blended to change state over a specific narrow temperature range, for example 72° to 76° F, to produce linear motion of a piston 30. The piston 30 engages a lever 32 pivoted on a pin 34 which is carried by the bracket 24. A rotatable arm 36 takes the form of a channel with one end 38 extending beneath and being engageable with the U-shaped frame 16. The other end of the rotatable arm 36 has slots 40 formed in the side walls of the channel and the pin 34 extends through the slots 40 to provide a pivotal support for the arm 36 while permitting longitudinal movement of the arm 36 relative to the pin 34. The lever 32 is provided with a pair of lugs 42 which normally extend through a pair of openings 44 in the arm 36 to prevent longitudinal movement of the arm 36. The bite portion of the channel forming the rotational arm 36 is relieved in the area adjacent the slots 40.

Figure 2:
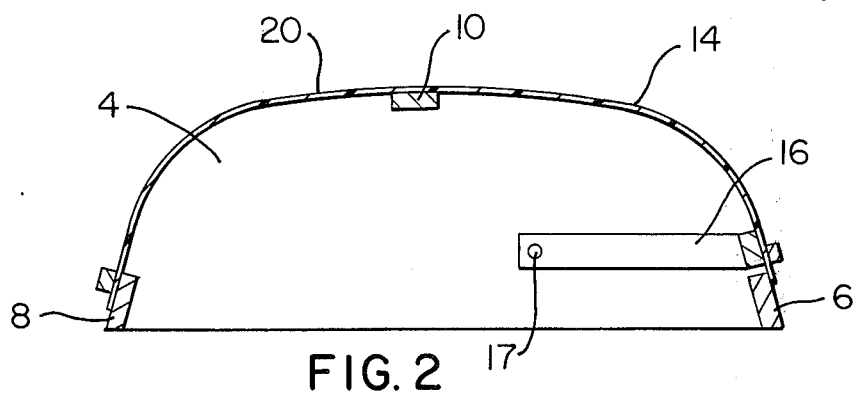
FIG. 2 is a sectional view taken on the line A—A of FIG. 1.

In operation, when the interior of the cold frame is relatively cool, as it would be at night or on a cloudy day, the positions of the various parts of the cold frame are as shown in FIGS. 1 and 2 with the center member of the U-shaped frame 16 resting on the side wall 6 and the cover member 14 engaging the top edges 18, 20 of the end walls 2, 4. When the cold frame is exposed to bright sunlight, the temperature of the interior will begin to rise. When the thermally responsive power element 28 senses the increased temperature, the piston 30 will extend to rotate the lever 32 which engages the rotatable arm 36 and rotates the same to lift the central portion of the rotatable frame 16. This flexes the cover member 14 causing it to assume a shape as shown in FIG. 3. In this position of the cover member 14 it is out of engagement with the end walls 2, 4 and ventilating air can enter the cold frame through a low opening between the frame 16 and the side wall 6 and exit through high openings formed between the cover member 14 and the edges 18, 20 of the end walls 2, 4. A chimney effect can thus be achieved and ventilation is maximized.

When the temperature of the interior of the cold frame drops, the power element 28 cools and the combined weights of the cover member 14, the rotatable frame 16, and the arm 36 act on the piston 30 through the level 32 to force the piston 30 back to its original position and permit the cover member to once again assume the position shown in FIG. 2. Since the top edges 18, 20 of the end walls 2, 4 are shaped to be complementary with the natural form assumed by the cover member 14, the cover member 14 does not drag on the edges 18, 20 when moving to the closed position so that closing movement of the cover member 14 is not impeded in any way by friction.

Figure 4:
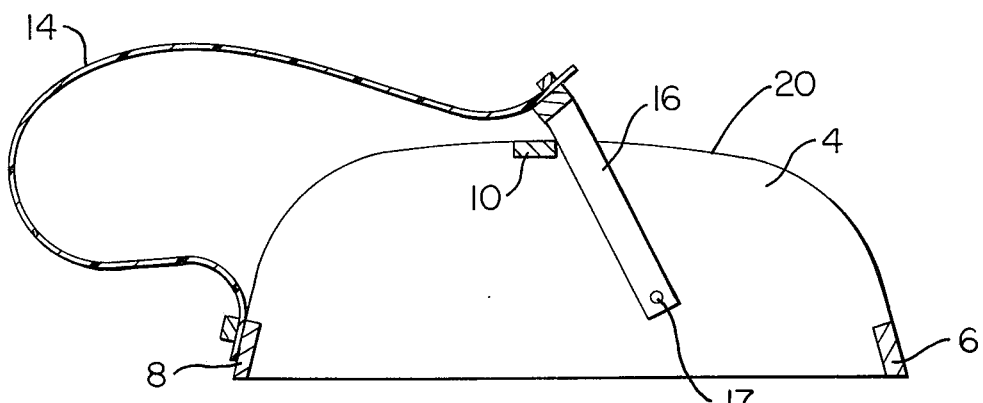
FIG. 4 is a view similar to FIG. 2 with the parts thereof in a third operating position.

To gain access to the interior of the cold frame, the U-shaped frame 16 may be manually rotated to lift the frame 16 out of engagement with the arm 36 and flex the cover member 14 to the position shown in FIG. 4. When the cover member is in this position after manual opening, it is desirable to disengage the rotatable arm 36 from the power element 28 to protect the mechanism from damage while working in the cold frame. To effect this, the arm 36 is manually rotated until the lugs 42 no longer extend through the openings 44. The arm 36 may then be moved longitudinally to the right as viewed in FIG. 7 to effectively disengage the lever 32 therefrom and then lowered to rest on the cross member 12. In this position of the arm 36, it will not be engaged by the lever 32 when the lever 32 is rotated by the power element 28 as the lever 32 will pass through the area where the bite portion of the channel of the arm 36 has been relieved.

Figure 9:
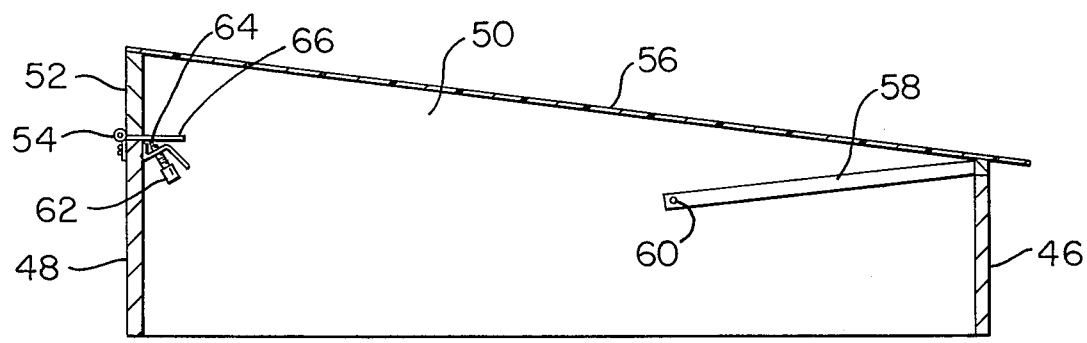
FIG. 9 is a view similar to FIG. 2 showing a second embodiment of this invention.
Figure 10:
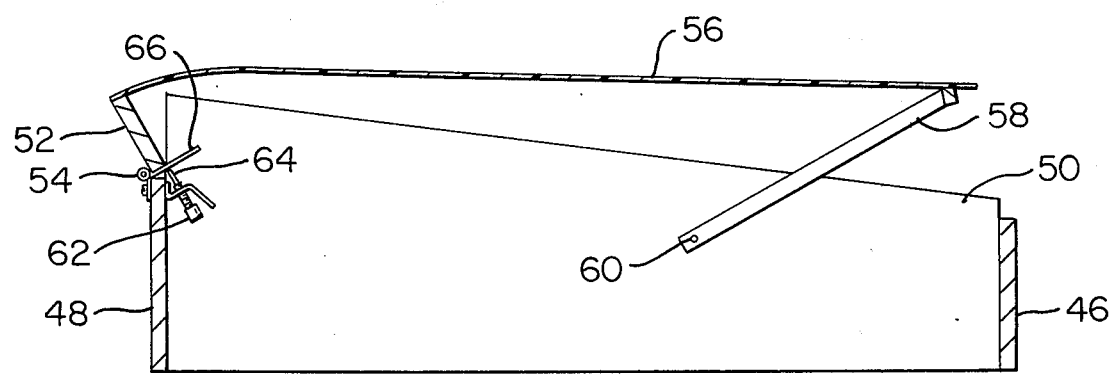
FIGS. 10 & 11 are views similar to FIG. 9 with the parts thereof in second and third operating positions.
Figure 11:
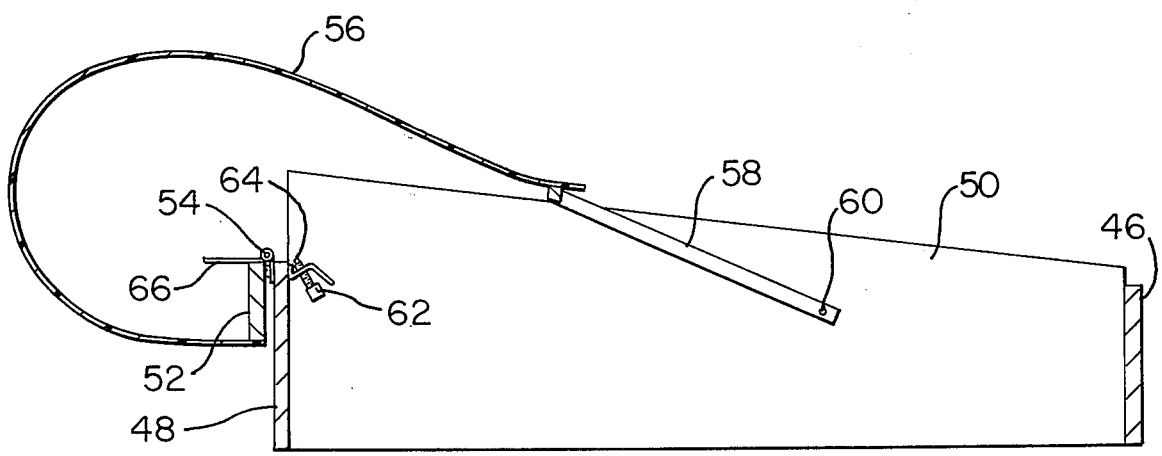

A second embodiment of this invention is shown in FIGS. 9 through 11. In this embodiment, a front wall 46 and a back wall 48 are connected by side walls 50 (only one of which is shown) to form a rectangular frame. A wall extension 52 is connected to the top edge of the back wall by a hinge 54. A cover member 56 of flexible, light-transmitting, self-supporting material is secured at one end to the wall extension 52 and at the other end to a U-shaped frame 58 supported by the side walls on suitable pivots 60. A thermally responsive thermal element 62 is mounted on the back wall 48 and includes a piston 64 engageable with an extension 66 formed on one arm of the hinge 54.

In operation, when the temperature of the interior of the cold frame is relatively cool, the parts will be positioned as shown in FIG. 9. A temperature rise within the cold frame will be sensed by the thermal element 62. The piston 64 will extend to rotate the wall extension 52, flexing the cover member 56 and rotating the U-shaped frame 58 to the position shown in FIG. 10. In this position, the cover member 56 is out of engagement with the top edges of the side walls 50 to provide ventilation openings on three sides of the cold frame.

When the temperature of the interior of the cold frame drops, the power element 62 will cool, permitting the weight of the U-shaped frame 58 and cover member 56, acting through the hinged wall extension 52 and hinge extension 66, to force the piston 64 back to its original position as the cover member returns to the closed position as shown in FIG. 9.

To gain access to the interior of the cold frame, the U-shaped frame 58 may be manually rotated to the position shown in FIG. 11 to flex the cover member 56 and move it completely out of the way.

While two embodiments of this invention have been described, it is to be understood that the scope of the invention is not limited thereto but is as defined by the following claims.

What is claimed is:

1. A cold frame comprising frame means including end walls and side walls, a cover mounting frame pivotally mounted on said frame means and movable through a plurality of positions opening and closing said cold frame, a cover member of light-transmitting, flexible sheet material of sufficient thickness and stiffness to cause the cover to assume a generally arcuate configuration when the ends thereof are constrained at a distance less than the length of said cover member, said cover member being connected at one end to one of said end walls and at the other end to said cover mounting frame at a distance less than the length of said cover member whereby said cover member will assume a generally arcuate unsupported configuration in a closed position of said cover mounting frame, said closed position being defined when said cover mounting frame is in adjacent mating relationship to the other end wall, said side walls having edges formed to be complementary with the configuration of said cover member when said cover mounting frame is in said closed position and engageable with said cover member when said cover mounting frame is in said closed position to define an enclosed space, and thermally responsive actuator means for rotating said cover mounting frame to flex said cover member and move said cover member relative to said side walls and to provide at least one ventilation opening between said side walls and said cover member for said enclosed space.

2. A cold frame as defined in claim 1 wherein said cover mounting frame comprises a U-shaped member pivoted on said side walls with the bite portion thereof connected to said other end of said cover member.

3. A cold frame as defined in claim 2 wherein said bite portion is engageable with the other of said end walls when said cover mounting frame is in said closed position.

4. A cold frame as defined in claim 3 wherein said thermally responsive actuator means includes a first lever pivoted on said frame means and engageable with said bite portion of said U-shaped member, a second lever pivoted on said frame means and engageable with said first lever, and a power element operatively associated with said second lever for rotating said second lever in response to temperature changes in said enclosed space.

5. A cold frame as defined in claim 4 wherein said first lever is axially movable between a first position wherein said first lever is in engagement with said second lever and a second position wherein said first lever is out of engagement with said second lever.

* * * * *